(12) United States Patent
Dunning et al.

(10) Patent No.: US 7,161,937 B1
(45) Date of Patent: Jan. 9, 2007

(54) METHOD AND APPARATUS FOR ROUTING ENCODED SIGNALS THROUGH A NETWORK

(75) Inventors: David Stewart Dunning, Portland, OR (US); Joel Christopher Dodd, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 423 days.

(21) Appl. No.: 08/766,895

(22) Filed: Dec. 13, 1996

(51) Int. Cl.
*H04L 12/28* (2006.01)

(52) U.S. Cl. ........................... 370/389; 370/390

(58) Field of Classification Search ............... 370/389, 370/390, 392, 357, 360, 366, 368, 377, 381, 370/384, 398, 422, 463, 378–379
See application file for complete search history.

(56) References Cited

U.S. PATENT DOCUMENTS

| 5,355,364 | A | * | 10/1994 | Abali | 370/392 |
| 5,422,881 | A | * | 6/1995 | May et al. | 370/392 |
| 5,442,474 | A | * | 8/1995 | Huang et al. | 370/389 |
| 5,465,251 | A | * | 11/1995 | Judd et al. | 370/389 |
| 5,721,820 | A | * | 2/1998 | Abali et al. | 709/243 |

FOREIGN PATENT DOCUMENTS

EP          669736 A2 *  8/1995

OTHER PUBLICATIONS

Robert Gallager, Information theory and reliable coomunication, 1968, pp. 1-4.*

U.S. Appl. No. 08/738,377, filed Oct. 25, 1996, Dunning et al.

"Performance Analysis Of Local Computer Networks"; Authors: Joseph L. Hammond, Peter J.P. O'Reilly, Addison-Wesley Publishing Company, Inc, 1986, Chapter 4, pp. 111-140.

"Highly Parellel Comptuing"; Authors: George S. Almasi, Allan Gottlieb; The Benjamin/Cummings Publishing Co Inc., 1994, Chapter 8, pp. 381-410.

"A DC-Balanced Partitioned-Block 8B/10B Transmission Code"; Authors: A.X. Widmer, P.A. Franaszek, IBM J. Res. Develop., vol. 27, No. 5, Sep. 1983, pp. 440-451.

* cited by examiner

*Primary Examiner*—Steven HD. Nguyen
(74) *Attorney, Agent, or Firm*—Stuart A. Whittington

(57) ABSTRACT

Briefly, in accordance with one more embodiment of the invention, an integrated circuit includes: a switch adapted to receive a packet of binary digital signals as encoded binary digital signals including encoded binary digital signals used to route the packet through the network. The switch is further adapted to copy the encoded binary digital signals used to route the packet through the network, at least for decoding the encoded binary digital signals. Briefly, in accordance with yet another embodiment of the invention, an integrated circuit includes: a switch adapted to receive a packet of binary digital signals, the packet of binary digital signals including encoded binary digital signals specifying a route through a network without decoding. Briefly, in accordance with yet one more embodiment of the invention, an integrated circuit includes: a route unit adapted to produce binary digital signals to be included in a packet of binary digital signals that after encoding specify a route through a network without decoding.

27 Claims, 4 Drawing Sheets

METHOD AND APPARATUS FOR ROUTING ENCODED SIGNALS THROUGH A NETWORK

This patent application is related to concurrently filed U.S. patent application Ser. No. 08/766,792 entitled "Method and Apparatus for Routing Packets in a Cluster," by D. S. Dunning and J. C. Dodd, assigned to the assignee of the present invention, and herein incorporated by reference.

BACKGROUND OF THE INVENTION

1. Field of the Invention

The present invention relates to routing packets through a network and, more particularly, to routing packets using encoded signals.

2. Background Information

As technology advances, it has become increasingly common to couple separate nodes together so that the combination realizes greater computational power, such as for a cluster. In this context, a cluster refers to a network of nodes coupled in a known or predetermined configuration. In this context, the term node refers to a server, workstation, personal computer (PC), network connected input-output device, or network connected computing device. As clusters increase in size and power, by coupling additional nodes together, one issue relates to routing packets of information in the form of electronic or electrical signals between the nodes. Typically, the routing is performed by one or more switches that are employed to couple the plurality of nodes together. In a typical network, each node is coupled to a network interface component (NIC) and these network interface components are coupled to a switch or a plurality of switches. Typically, the network interface components include an encoder that encodes and serializes the signals for transmission across a link to a switch.

An emerging trend in data transfer between two system components is the use of serial links. This method has a number of advantages including cost effectiveness; however, to send these signals serially it is desirable to encode the bit stream so that at least a selected number and a selected frequency of bit transitions occur in the bit stream. These transitions are desirable so that a clock signal may be derived from the bit stream, such as by using a phase locked loop or delay locked loop, for example. A clock signal is employed to latch the data at the receiving component. One common method of encoding is described in "A DC-Balanced, Partitioned-Block, 8 B/10 B Transmission Code" by A. X. Widmer and P. A. Franaszek, published in IBM.J RES. DEVELOP., Volume 27, Number 5, September 1983, herein incorporated by reference. One disadvantage of this encoding approach is that at the receiving end of each link, the binary digital signals are deserialized and decoded. This introduces additional hardware and additional complexity into the system. A need therefore exists for addressing this problem.

SUMMARY OF THE INVENTION

Briefly, in accordance with one embodiment of the invention, a method of routing a packet of binary digital signals through a network includes the steps of: receiving at a switch in the network the packet of binary digital signals as encoded binary digital signals including encoded binary digital signals used to route the packet through the network; and copying the encoded binary digital signals used to route the packet through the network, at least for decoding the encoded binary digital signals.

Briefly, in accordance with another embodiment of the invention, a method of routing a packet of binary digital signals through a network includes the steps of: receiving at a switch in the network the packet of binary digital signals as encoded binary digital signals including encoded binary digital signals specifying a route through the network without decoding.

Briefly, in accordance with one more embodiment of the invention, an integrated circuit includes: a switch adapted to receive a packet of binary digital signals as encoded binary digital signals including encoded binary digital signals used to route the packet through the network. The switch is further adapted to copy the encoded binary digital signals used to route the packet through the network, at least for decoding the encoded binary digital signals.

Briefly, in accordance with yet another embodiment of the invention, an integrated circuit includes: a switch adapted to receive a packet of binary digital signals, the packet of binary digital signals including encoded binary digital signals specifying a route through a network without decoding.

Briefly, in accordance with yet one more embodiment of the invention, an integrated circuit includes: a route unit adapted to produce binary digital signals to be included in a packet of binary digital signals that after encoding specify a route through a network without decoding.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF THE INVENTION

In the following detailed description numerous specific details are set forth in order to provide a thorough understanding of the present invention. However, it will be understood by those skilled in the art that the present invention may be practiced without these specific details. In other instances well-known methods, procedures, components, and circuits have not been described in detail so as not to obscure the present invention.

Some portions of the detailed description which follow are presented in terms of algorithms and symbolic representations of operations on data bits or binary digital signals within a computer memory. These algorithmic descriptions and representations are the means used by those skilled in the data processing arts to convey the substance of their work to others skilled in the art. An algorithm is here, and generally, considered to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities. Unless specifically stated otherwise as apparent from the following discussions, it is appreciated that throughout the specification, discussions utilizing terms such as "processing" or "computing" or "calculating" or "determining" or the like, refer to the action and processes of a computer system, or similar electronic computing device, that manipulate and transform data represented as physical (electronic) quantities within the computing system's registers and/or memories into other data similarly represented as physical quantities within the computing system's memories, registers or other such information storage, transmission or display devices.

Figure 1:
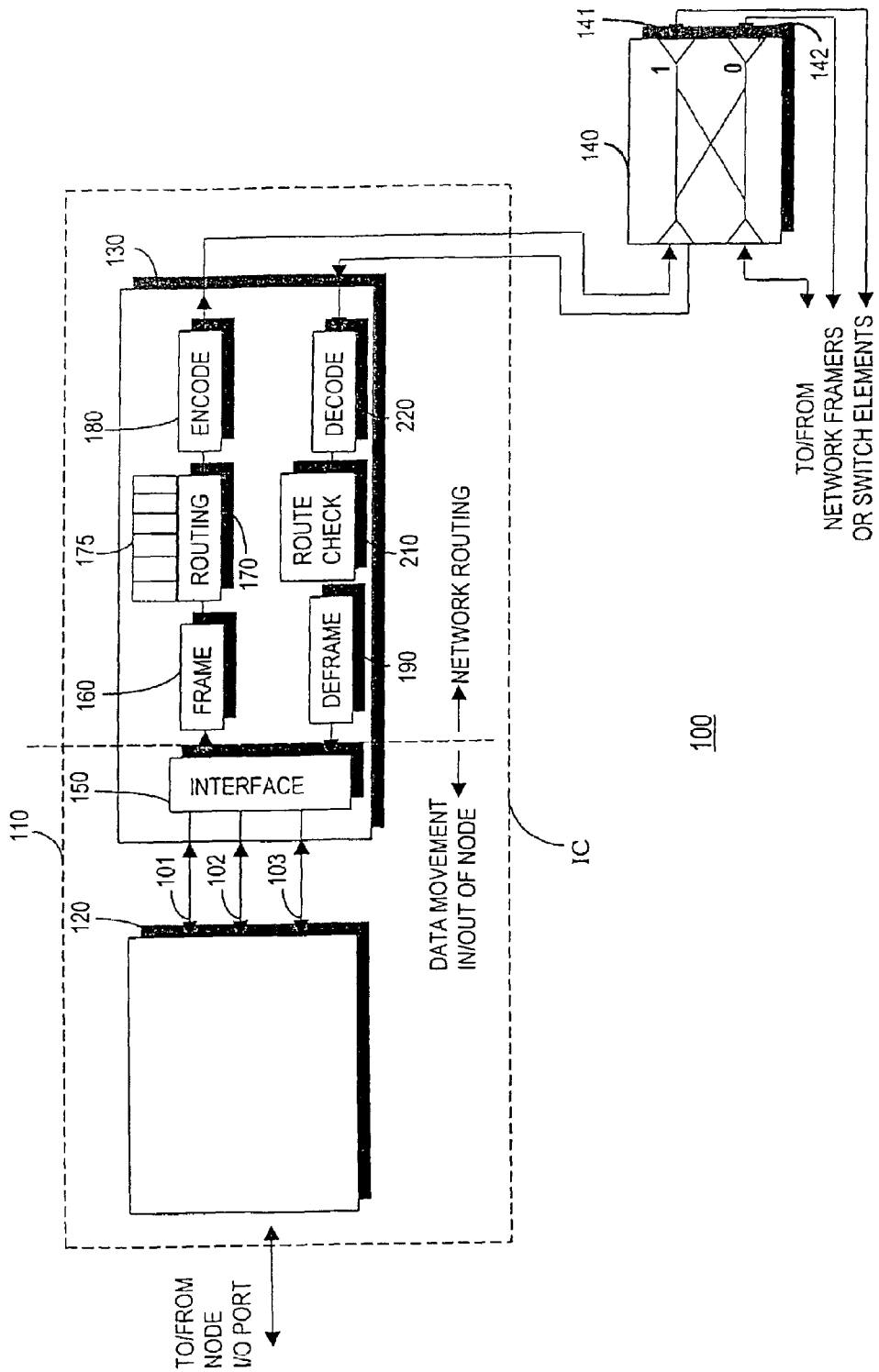
FIG. 1 is a block diagram illustrating an embodiment of a portion of a network. The network employs an embodiment of an apparatus for routing encoded signals through a network in accordance with the present invention.

FIG. 1 illustrates an embodiment 100 in accordance with the present invention. Switch 140 comprises a bi-directional cross bar switch element, although the invention is not limited in scope in this respect. The details of implementing a bi-directional cross bar switch element other than as relates to the present invention are well-known and, therefore, not explicitly illustrated. Other types of switches, such as 2-D meshes, 3-D meshes, 2-D tori, 3-D tori, Omega, Banyon, hypercube, or binary tree, to name a few, as described, for example, in *Highly Parallel Computing*, 2nd Ed, by George S. Almasi and Allan Gottlieb, available from the Benjamin/Cummings Publishing Company, Inc. (1994) or in *Performance Analysis of Local Computer Networks*, by Joseph L. Hammond and Peter J. P. O'Reilly, available from Addison-Wesley Publishing Company (1986), both texts herein incorporated by reference, for example, may be employed.

Likewise, element 110 comprises a network interface component (NIC), which may, for example, be implemented on an integrated circuit (IC), as illustrated. Element 120 comprises electronic circuitry for data movement into and out of a node via a coupling to an input/output port of the node. The details of circuitry 120 are well-known and not specifically illustrated, but may typically include a bus interface unit to interface with a CPU and host memory, register(s) for status and control, memory for the bus interface unit and an outbound buffer and an inbound buffer in order to queue packets of information being provided to the node and packets being provided from the node. Typical bus protocols used in a bus interface unit include PCI (peripheral components interface), EISA (Extended Industry Standard Architecture), ISA (Industry Standard Architecture), and multibus, for example.

In this particular embodiment, signal paths 101, 102 and 103 comprise bi-directional paths, although, of course, the invention is not limited in scope in this respect. Signal path 101 provides digital signal information to and from framer 130. Signal path 103 provides status and control signal information between framer 130 and circuitry 120, and signal path 102 between interface 150 and electronic circuitry 120 provides digital data signals to be queued in circuitry 120 until the signals may be transferred to the node via the previously mentioned bus interface unit. Again, the details of implementing electronic circuitry 120 are well-known to those of ordinary skill in the art and will not be discussed further.

Referring now to framer 130, it comprises interface 150, as previously indicated. Likewise, in this particular embodiment, framer 130 has two internal signal paths having opposing directions. One signal path direction provides signals to switch 140 from a node coupled to electronic circuitry 120 and ultimately to additional nodes coupled to switch 140 via NICs (not shown) and another opposing signal path direction provides signals from the nodes coupled to switch 140 via NICs so that ultimately the signals may be provided to the node coupled to electronic circuitry 120. Likewise, switch 140 may, alternatively, be coupled to other switches, such as in a multi-stage network of switches, for example. In this particular embodiment, interface 150 is a generic parallel data path interface. Of course, the invention is not limited in scope to use for a particular bus or communications protocol. Many bus or communications protocols may be employed, such as Ethernet, ATM (asynchronous transfer mode) or fibre channel, to name only a few.

Figure 2:
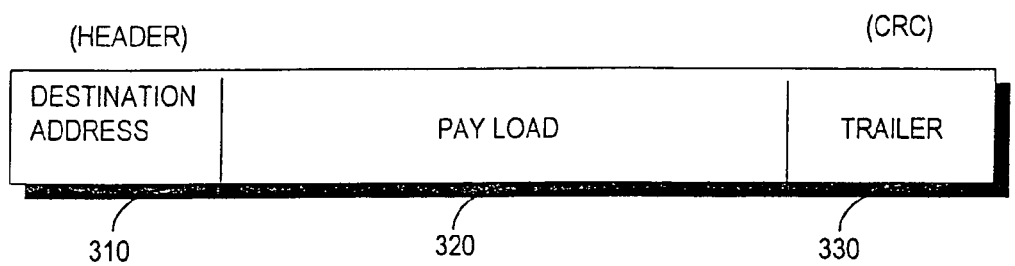
FIG. 2 is a schematic diagram of an embodiment of a packet that may be employed by an embodiment of a network or by an embodiment of an apparatus for routing encoded signals through a network in accordance with the present invention.

Assume a packet is being transferred from the node directly coupled to circuitry 120. FIG. 2 illustrates a sample packet of binary digital signals, although the invention is not limited in scope in this respect. As illustrated in FIG. 2 in this embodiment, the packet includes a destination address as part of a header 310, a trailer 330 for use in cyclical redundancy checking, for example, and a payload 320. The payload includes the data or binary digital signals being transferred. Assume the packet is provided via path 101 to interface unit 150 in this embodiment. The packet is then framed in frame unit 160 which provides another level of encapsulation for the packet. In this particular embodiment, a start of frame, an end of frame, sync words, an idle, and possible additional special characters may be employed. Of course, the invention is not limited in scope in this respect. This encapsulation tends to be network specific.

Next the packets are provided for routing to route unit 170. More information regarding a particular technique for routing is provided in the aforementioned "Method and Apparatus for Routing Packets in a Cluster," although the invention is not limited in scope to the particular approach described there. However, in this particular embodiment routing is performed in the NIC instead of in the switch, although the present invention is again not limited in scope in this respect. Next, the packet is encoded as illustrated by encode unit 180 in FIG. 1. In this embodiment, this encoding comprises low level encoding for the serial transfer of signals through the network. Therefore, in this embodiment, serializing the packet is considered part of the encoding performed by the encoder. One example of an encoding scheme includes Manchester encoding, although others are available, such as the one described below. The invention is not limited in scope to a particular coding scheme. Furthermore, in other encoding schemes that may be used in conjunction with an embodiment in accordance with the invention, the binary digital signals may not be transferred entirely serially.

A common method of encoding is described in the previously referenced article "A DC-Balanced, Partitioned-Block, 8B/10B Transmission Code". Typically, when using serial links between nodes through a switch or plurality of switches, the packet of binary digital signals is serialized and encoded at the source node, and sent across the link to the switch. There it is usually deserialized and decoded so that the switch may determine the route or destination address, it is then reserialized and re-encoded and passed to another switch component. The next component may be the final destination or may be another switch along the path to the destination for the packet, for example, in which additional decoding and encoding may be performed.

In summary, the packet of binary digital signals is deserialized and decoded at least one time and reserialized and re-encoded at one or more intermediate locations before it arrives at the destination where it is decoded and deserialized for the last time. This approach in the switch to decoding and then re-encoding has disadvantages and, therefore, is not the approach employed in accordance with the present invention. However, other than with respect to the present invention, the details of interfacing, framing, routing and encoding are well-known to those of ordinary skill in the art and will not be discussed further.

In one embodiment of a method for routing encoded signals through the network in accordance with the invention, the packet including a portion of the header may be received at a switch, such as switch 140 in FIG. 1, and the portion of the header may include encoded binary digital signals specifying a route through the network without decoding the header portion. More specifically, rather than decoding bits in the portion of the header that provides the switch information on how to route a packet to a destination port or address and then re-encoding those bits, instead a bit pattern is chosen so that when the bit pattern is encoded it directly provides information regarding routing the packet through the network in its encoded form. Therefore, the encoded binary digital signals specify a route through the network without decoding. This may be accomplished using a look-up table in a route unit or router, for example, although the invention is not limited in scope in this respect. In this context, the terms route unit and router are used interchangeably.

By way of example, assume that the binary digital signals 10011011 provide information regarding how to route a packet through a network. For example, the sequence of ones and zeros designate a path through a series of coupled bi-directional cross bar switch elements, although the invention is not limited in scope in this respect, of course. Instead of encoding that bit pattern and employing the encoded bit pattern, use as the portion of the header providing routing information, in this embodiment, a bit pattern that after it is encoded provides a form of the bit pattern just described, such as 0100110110. Thus, in this example, the encoded bit pattern comprises 0100110110, although 10011011 directly provides signal information for routing the packet through the network. Of course, there may be issues to address due to the fact that eight bits when encoded may produce 10 bits, if, for example, the encoding technique described in the previously referenced article "A DC-Balanced, Partitioned-Block, 8B/10B Transmission Code" is employed. In one possible embodiment in accordance with the invention, for example, zeroes may be applied to the front end and back end of the encoded routing portion of the packet and these additional zeros at the front end and back end may be ignored by the switch during operation. Furthermore, in this example, the decoded bit pattern for 0100110110 will be obtained to be able to produce the encoded bit pattern. One advantage of this approach is that a decoder would not be needed for the switches because the encoded bit pattern would contain the routing information without performing decoding, therefore, circuit complexity and cost would be significantly reduced for the switch. Also, latency would be reduced. As previously indicated in this embodiment, a portion of the header would include encoded binary digital signals specifying a route through the network without decoding, therefore, the packet would be routed in accordance with the encoded binary digital signals. The routing may comprise routing the packet to another switch in the network or to its destination, for example. Furthermore, as will be appreciated by those skilled in the art, the invention is not limited to employing the encoded routing bits in the header.

FIG. 1 illustrates a block diagram in which only one switch is shown. However it is useful for illustrating signals arriving at a NIC and the node coupled to the NIC. In such a situation, packets arrive via switch 140 to the lower path of NIC 110 shown in FIG. 1 including decode unit 220, route check unit 210 and deframe unit 190. In this particular embodiment, decoding the encoded header will introduce no technical issues because a portion of the encoded header was merely used to route the packet through the network. Likewise, in this context, as previously indicated, decoding includes deserializing. However, the remaining portions of the packet are decoded. Route checking employs a cyclical redundancy code (CRC) to verify that the packet that has arrived is uncorrupted, although alternatives, such as error correcting codes (ECCs) may be employed, for example. Likewise, a deframe unit removes the encapsulation of the packet so that the packet may be transmitted by interface 150 and via path 102 in this embodiment to circuitry 120. In circuitry 120, the packet is buffered in this embodiment until the bus interface unit transfers it to a node input/output port. The details of decoding (including deserializing), route checking, deframing, and buffering are well-known to those of ordinary skill in the art and will not be discussed further except in relation to the present invention. It will, of course, now be appreciated that the invention may be practiced in alternative embodiments in which aspects, such as framing, deframing, or route checking, as examples, need not be employed.

This approach to routing provides a number of advantages over alternative approaches. First, this employs the approach described in the previously referenced patent application "Method and Apparatus for Routing Packets in a Cluster," although the invention is not restricted to employing this technique. Therefore, advantages of performing the routing in the NIC rather than the switch, may apply here as well. Furthermore, another advantage is that there is no need to decode the header and then re-encode it. In each switch this will reduce hardware complexity and processing time. Furthermore, when the NIC employs a look-up table or other digital circuitry so that the encoded header provides the appropriate routing information, it is not necessary to do this for all possible routes through the network. Again, assuming the routing is performed in the NIC, if not all routes are supported, then it is desirable to employ a look-up table or circuitry that will provide routing headers for only those routes being used in the network, saving memory and processing time.

Figure 3:
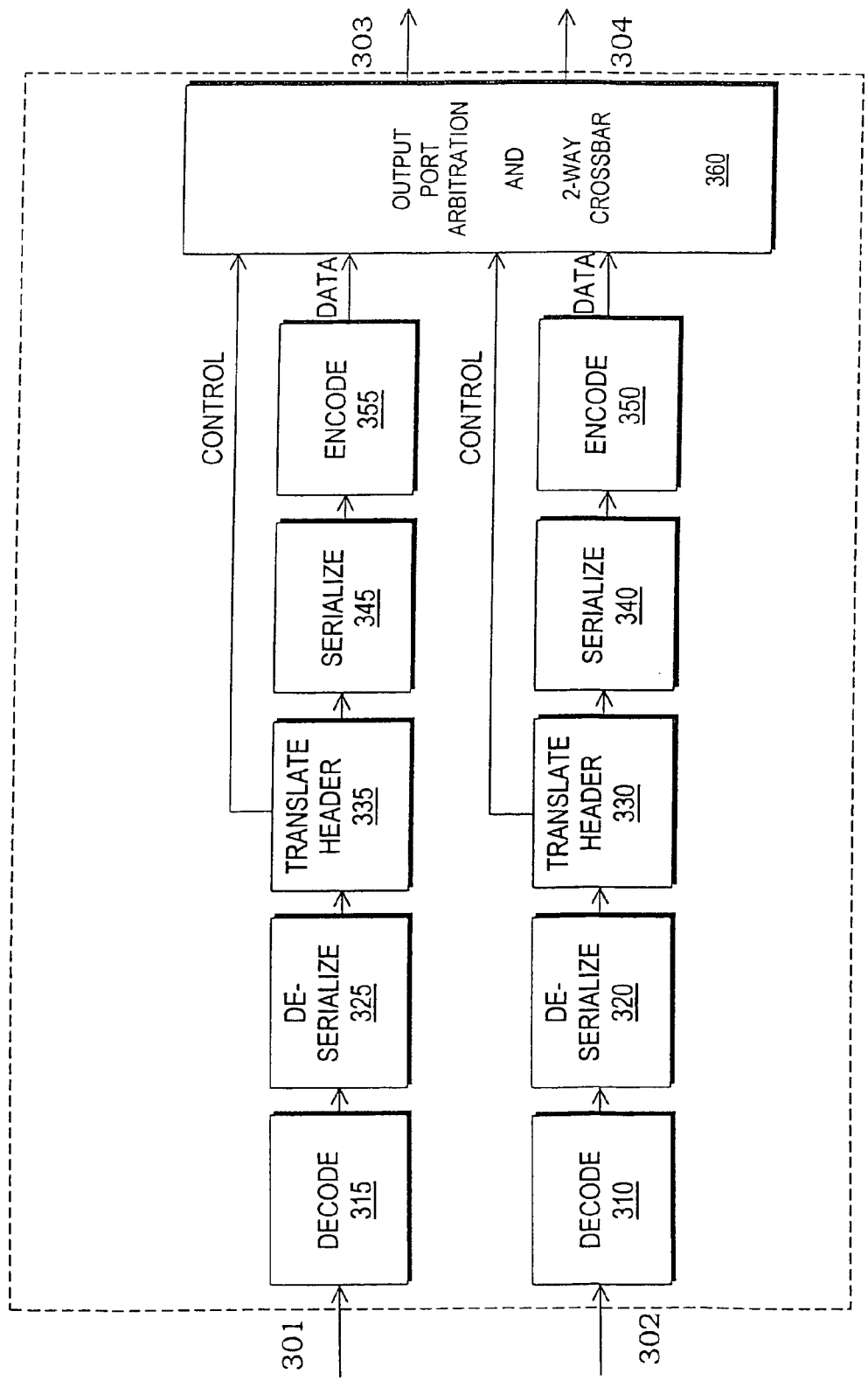
FIG. 3 is a block diagram illustrating an embodiment of a typical switch.

Alternative embodiments for routing encoded signals through a network in accordance with the invention are also possible. FIG. 3 is a block diagram 300 illustrating in more detail the operation of a typical switch, such as switch 140, for example. Switch 300 is illustrated as embodied on an integrated circuit (IC), although the invention is not limited in scope in this respect. For convenience, block diagram 300 is not illustrated as bi-directional, although typically it would be implemented as a bi-directional switch. Also, in this embodiment, in comparison with the encode and decode units illustrated in the NIC of FIG. 1, the operations of decoding and deserializing, as well as encoding and serializing, are illustrated separately in the block diagram. As illustrated, encoded binary digital signals are applied to input ports 301 and 302 of switch 300. Thus, two paths are available for processing packets of binary digital signals. Encoded binary digital signals are decoded by decode units 310 and 315. Likewise, the decoded signals are deserialized to form a packet of binary digital signals, such as by units 320 and 325. Then, the header of a packet is translated. For example, a portion of the header typically contains a destination address and this is translated to route a packet of binary digital signals to the next switch. Therefore, the encoded binary digital signals for a packet, in this embodiment a portion of the header, provides signals used to route the packet through the network. Typically, this translation may be accomplished by a look-up table, although other approaches may be employed. This routing operation is illustrated in FIG. 3 by a control signal from translate header units 330 and 335 to output port arbitration and 2-way crossbar unit 360. Likewise, packets of binary digital signals are then re-serialized by units 340 and 345 and re-encoded by units 350 and 355. In this encoded signal form, the packets of binary digital signals are then routed as indicated by the control signals.

Figure 4:
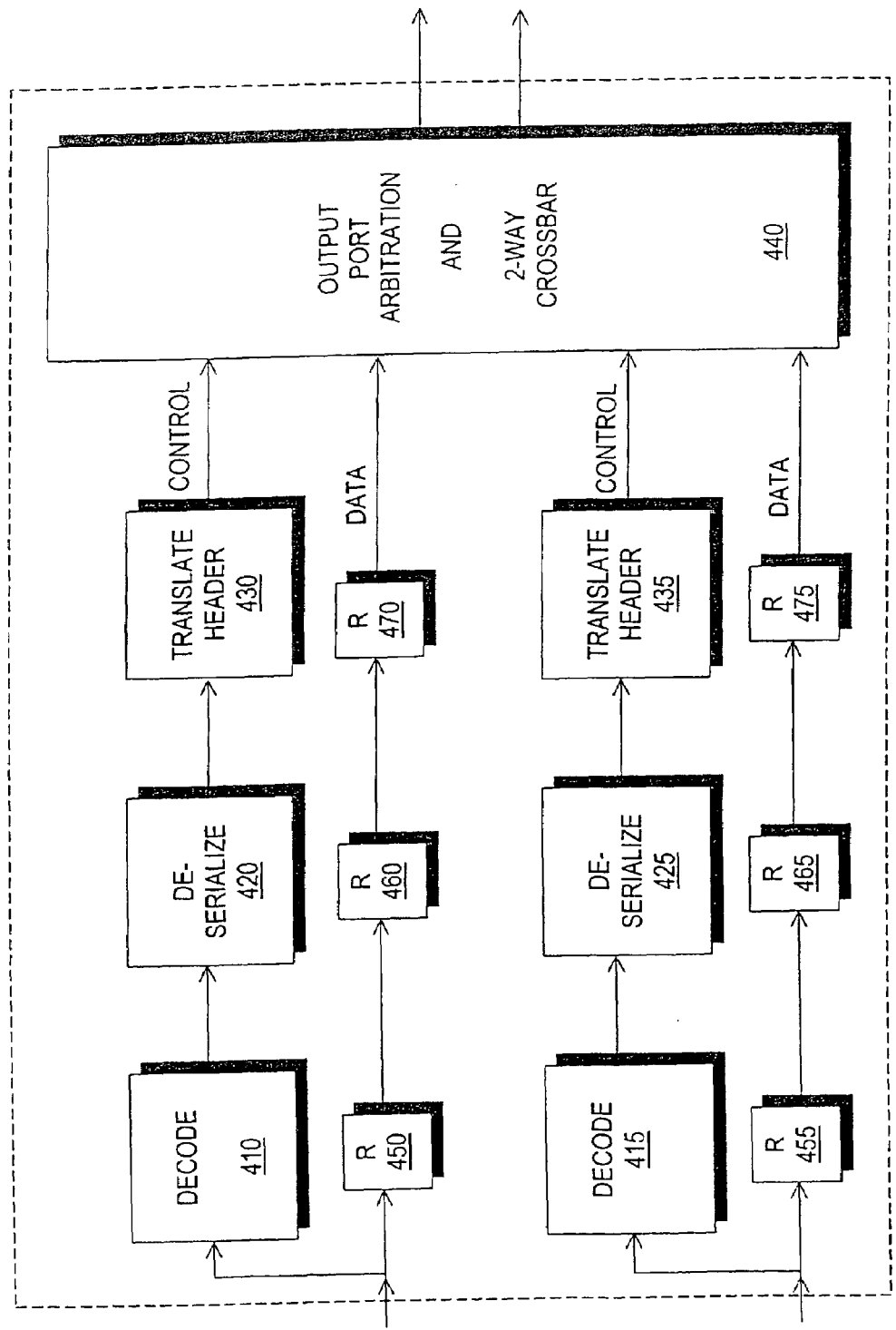
FIG. 4 is a block diagram illustrating another embodiment of an apparatus for routing encoded signals through a network in accordance with the present invention.

For an embodiment of an apparatus for routing encoded signals through a network in accordance with the invention, such as embodiment 400 in FIG. 4, the switch need not deserialize or decode most of a packet of binary digital signals. The information useful to the switch relates to routing the packet through the remaining network after the packet arrives at the switch. Therefore, in this particular embodiment, the portion of the header of encoded binary digital signals providing routing information specifying a route through the network if decoded are kept together and at the front of each packet. Of course, the invention is not limited in scope in this respect, for example, the encoded signals for routing the packet need not be placed in the header portion. Other portions of the packet may also prove adequate. However, as illustrated in FIG. 4, for this particular embodiment, as packets of binary digital signals arrive a bit at a time, the switch may electronically copy only the portion of the header providing routing information of the packet and separately from the received packet of binary digital signals. The switch may then decode and deserialize those binary digital signals to determine where to route the packet. This may be accomplished a variety of ways. For example, dual or parallel signal paths including latches may be employed to produce a copy of only the binary digital signals providing routing information. Switch 400, like switch 300, includes two signal paths to receive and process packets of binary digitals Therefore, the operations of decoding and deserializing the portion of the header are performed by units 410, 415, 420, and 425. In this embodiment, translating the header may amount to using the decoded bits to route the packet and a control signal providing routing information is then provided to output port arbitration and 2-way cross bar unit 440. For this figure, as for FIG. 3, the bi-directional aspect of the switch is not illustrated for convenience. Because the decoding, deserializing and translating is done via copying the binary digital signals along a separate parallel path in this embodiment, the binary digital signals of the packet are received and remain intact, such as via registers 450, 455, 460, 465, 470, and 475, and there is no need to reserialize or re-encode the packet or even the header portion of the packet. Therefore, there is no need to implement an encoder in the switch, thereby reducing circuit complexity and cost. Furthermore, this is more efficient because re-encoding and reserializing also takes processing time. Likewise, in alternative embodiments, in which the encoded binary digital signals specify a route through the network, it may be sufficient to simply decode the binary digital signals without deserializing or translating the signals.

When routing a packet through a network in this particular embodiment, the packet is received at a switch in the network including a portion of the header providing routing information. In this embodiment, the header portion includes binary digital signals specifying a route through the network. However, for this particular embodiment, it is desirable to deserialize and decode the portion of the header providing routing information. Therefore, that portion of the header of the packet is copied separately from the processing of the packet of binary digital signals, and that copied portion is deserialized and decoded, in order to determine the route for the packet. The packet is then routed in accordance with the translated header portion copy. Because in this particular embodiment, the approach described in "Method and Apparatus for Routing Packets in a Cluster" is employed, translate header units 430 and 435 merely need to use the decoded bits to route the packet, although the invention is not limited in scope in this respect. The packet may be routed to another switch in the network where this process may be repeated or to its destination, depending on the particular route. In an alternative embodiment of the present invention, similar to FIG. 3, the header may instead comprise a destination address and the translate header unit may translate that address to further route the packet. It is noted that for the particular embodiment illustrated in FIG. 4, the portion of the header translated to provide routing information is ultimately discarded once that signal information is employed to route the packet of binary digital signals. Furthermore, as previously discussed, only the portion of the header in this particular embodiment useful for routing is copied along the parallel decoding-deserializing-translating path in switch 400. Although the precise circuitry to accomplish this is not specifically illustrated, this should be evident to one of ordinary skill in the art and will not be further discussed. Finally, although this embodiment illustrates decoding as preceding deserializing, the invention is not limited in scope in this respect. In an alternative embodiment, deserializing may precede decoding, for example.

While certain features of the invention have been illustrated as described herein, many modifications, substitutions, changes and equivalents will now occur to those skilled in the art. For example, an embodiment in accordance with the invention may be implemented in software executing on a microprocessor. It is, therefore, to be understood that the appended claims are intended to cover all such modifications and changes as fall within the true spirit of the invention.

The invention claimed is:

1. A method of routing a packet of binary digital signals through a network, said method comprising:
   receiving at a switch in said network the packet of binary digital signals as encoded binary digital signals including a bit pattern chosen so that when the bit pattern is encoded it directly provides information regarding routing the packet through the network in its encoded form; and
   copying said bit pattern, at least for decoding.
2. The method of claim 1, and further comprising a step of decoding the copied encoded binary digital signals.

3. The method of claim 2, wherein the step of receiving the packet of binary digital signals comprises receiving the packet serially; and further comprising a step of deserializing the decoded binary digital signals.

4. The method of claim 3, and further comprising a step of translating the deserialized and decoded binary digital signals.

5. The method of claim 4, and further comprising a step of routing the received packet of binary digital signals in accordance with the translated binary digital signals.

6. The method of claim 5, wherein the step of routing comprises routing the packet of binary digital signals to another switch in the network.

7. The method of claim 5, wherein the step of routing comprises routing the packet of binary digital signals to its destination in the network.

8. The method of claim 1, wherein said encoded binary digital signals used to route the packet through the network comprise an encoded destination address.

9. The method of claim 1, wherein said encoded binary digital signals used to route the packet through the network comprise encoded binary digital signals specifying a route through the network if decoded.

10. An integrated circuit comprising: a switch adapted to receive a packet of binary digital signals as encoded binary digital signals including a bit pattern chosen so that when the bit pattern is encoded it directly provides information regarding routing the packet through the network in its encoded form;
    said switch being further adapted to copy the encoded binary digital signals including the bit pattern, at least for decoding.

11. The integrated circuit of claim 10, wherein said switch is further adapted to serially receive said packet and to serially copy the encoded binary digital signals used to route the packet through the network.

12. The integrated circuit of claim 11, wherein said switch is further adapted to decode and deserialize of the copied encoded binary digital signals used to route the packet through the network.

13. The integrated circuit of claim 12, wherein said switch is further adapted to translate the decoded and deserialized binary digital signals.

14. The integrated circuit of claim 13, wherein said switch is coupled in the network, said switch being adapted to route the received packet of binary digital signals in accordance with the translated binary digital signals.

15. The integrated circuit of claim 10, wherein the encoded binary digital signals used to route the packet through the network comprise an encoded destination address.

16. The integrated circuit of claim 10, wherein the encoded binary digital signals used to route the packet through the network comprise encoded binary digital signals specifying a route through the network if decoded.

17. A method of routing a packet of binary digital signals through a network, said method comprising:
    receiving at a switch in the network the packet of binary digital signals as encoded binary digital signals including a bit pattern chosen so that when the bit pattern is encoded it directly provides information regarding routing the packet through the network in its encoded form without decoding.

18. The method of claim 17, wherein said encoded binary digital signals specifying a route through the network without decoding comprise a portion of the header of the packet of binary digital signals.

19. The method of claim 17, and further comprising a step of: routing the packet of binary digital signals in accordance with the encoded binary digital signals specifying a route through said network without decoding.

20. The method of claim 19, wherein the step of routing comprises routing the packet of binary digital signals to another switch in the network.

21. The method of claim 19, wherein the step of routing comprises routing the packet of binary digital signals to a destination in the network.

22. An integrated circuit comprising:
    a switch adapted to receive a packet of binary digital signals, the packet of binary digital signals including a bit pattern chosen so that when the bit pattern is encoded it directly provides information regarding routing the packet through a network in its encoded form without decoding.

23. The integrated circuit of claim 22, wherein said encoded binary digital signals comprise a portion of the header of the packet of binary digital signals.

24. The integrated circuit of claim 23, wherein said switch is coupled in the network, said switch being adapted to route the packet of binary digital signals in accordance with the encoded binary digital signals specifying a route through the network without decoding.

25. An integrated circuit comprising: a route unit adapted to produce binary digital signals to be included in a packet of binary digital signals that after encoding includes a bit pattern chosen so that when the bit pattern is encoded it directly provides information regarding routing the packet through a network in its encoded form without decoding.

26. The integrated circuit of claim 25, wherein said route unit is embodied in a network interface component (NIC).

27. The apparatus of claim 26, wherein said NIC is coupled to a switch, said switch being adapted to route the packet of binary digital signals through the network in accordance with the encoded binary digital signals specifying a route through the network without decoding.

* * * * *

UNITED STATES PATENT AND TRADEMARK OFFICE
CERTIFICATE OF CORRECTION

PATENT NO. : 7,161,937 B1
APPLICATION NO. : 08/766895
DATED : January 9, 2007
INVENTOR(S) : Dunning et al.

It is certified that error appears in the above-identified patent and that said Letters Patent is hereby corrected as shown below:

In column 10, at line 49, delete "apparatus" and insert --integrated circuit--.

Signed and Sealed this

Second Day of September, 2008

JON W. DUDAS
*Director of the United States Patent and Trademark Office*